UNITED STATES PATENT OFFICE.

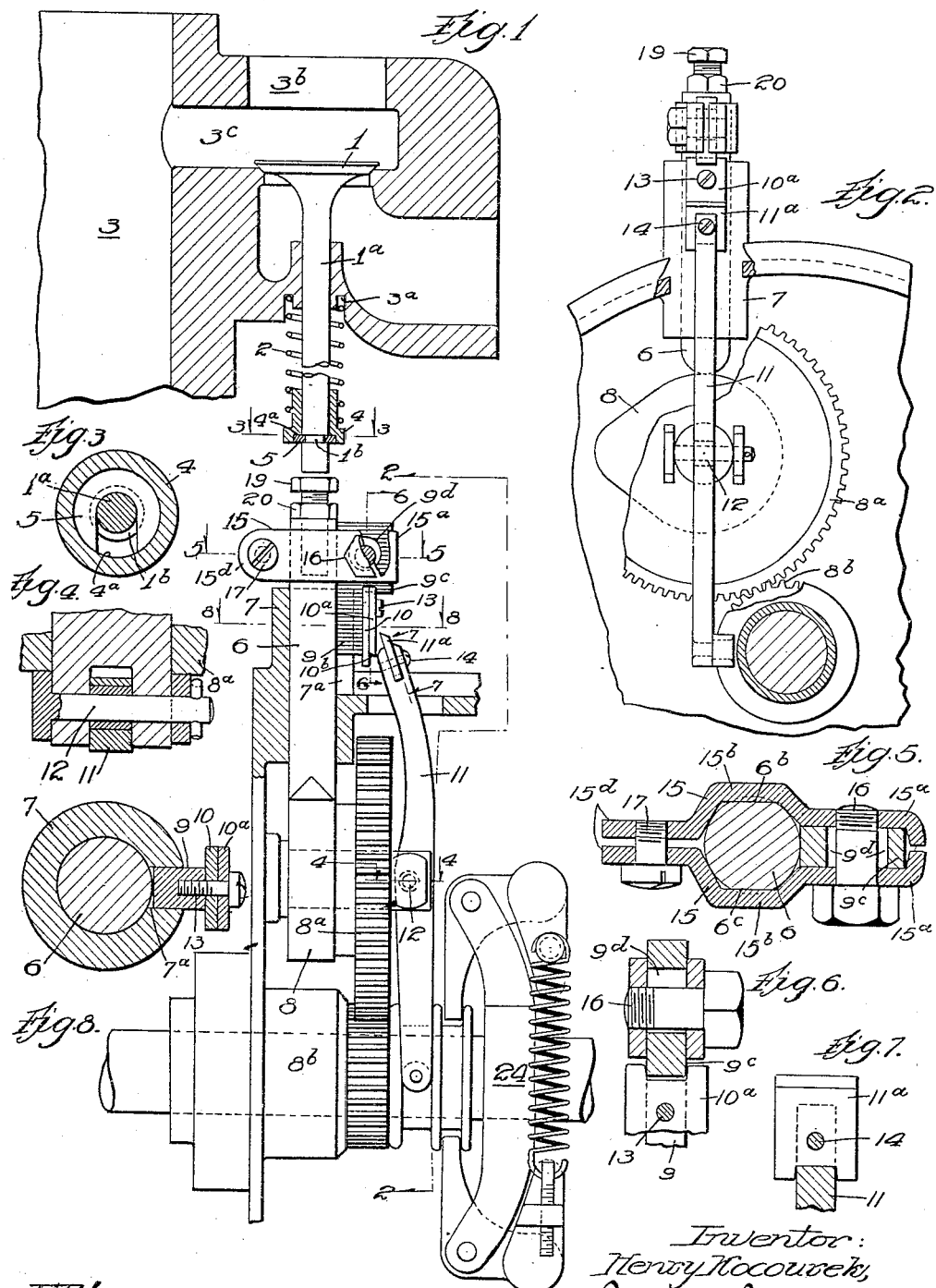

HENRY KOCOUREK, OF CHICAGO, ILLINOIS, ASSIGNOR TO THE CHICAGO FLEXIBLE SHAFT COMPANY, OF CHICAGO, ILLINOIS, A CORPORATION OF ILLINOIS.

HIT-OR-MISS VALVE-ACTION FOR INTERNAL-COMBUSTION ENGINES.

1,331,507.  Specification of Letters Patent.  Patented Feb. 24, 1920.

Application filed March 8, 1919. Serial No. 281,351.

*To all whom it may concern:*

Be it known that I, HENRY KOCOUREK, a citizen of the United States, with residence at Chicago, in the county of Cook and State of Illinois, have invented certain new and useful Improvements in Hit-or-Miss Valve-Actions for Internal-Combustion Engines, of which the following is a specification, reference being had to the accompanying drawings, forming a part thereof.

The purpose of this invention is to provide an improved construction of a hit-or-miss governor valve action for internal combustion engines. It consists in the elements and features of construction shown and described, as indicated in the claims.

In the drawings:

Figure 1 is a partially sectional view, consisting of an end elevation of a hit-or-miss governing device embodying this invention, in conjunction with the valve operated thereby, the valve-governed passages of the engine being shown in section axial with respect thereto.

Fig. 2 is a section at the line, 2—2, on Fig. 1.

Fig. 3 is a section at the line, 3—3, on Fig. 1.

Fig. 4 is a section at the line, 4—4, on Fig. 1.

Fig. 5 is a section at the line, 5—5, on Fig. 1.

Fig. 6 is a section at the line, 6—6, on Fig. 1.

Fig. 7 is a section at the line, 7—7, on Fig. 1.

Fig. 8 is a section at the line, 8—8, on Fig. 1.

In the structure shown in the drawings, the valve which is to be governed by hit-or-miss action is shown at 1, $3^c$ being the valve-controlled passage for connection with the engine-cylinder, 3. 2 is the spring by which the valve is seated, reacting between the shoulder, $3^a$, of the engine casting, 3, and a stop collar, 4, on the valve stem, $1^a$. Said stop collar is releasably locked on the valve stem by means of a forked or slotted washer, 5, which engages an annular groove, $1^b$, in the valve stem, $1^a$, and is also seated in an annular recess, $4^a$, in the under side of the washer, 4, for preventing it from escaping from the annular groove, $1^b$. The valve is thereby rendered easily withdrawable for any attention which may be required to its seat or to the valve itself, by merely pushing up the collar, 4, so as to disengage the forked washer, 5, from the recess, $4^a$, whereupon said washer, 5, may be withdrawn from the slot, $1^b$, leaving the valve free to be withdrawn through the opening, $3^b$.

6 is the valve-opening plunger which is cylindrical in form and which seats in a cylindrical bearing, 7, and having its lower end cylindroidal,—that is semi-cylindrical in form transverse to the axis for encounter of the valve-operating cam, 8, which is connected by gears, $8^a$, $8^b$, with the engine crank shaft for making one revolution for each two revolutions of said crank shaft in the usual manner of construction of internal combustion engines of the four-cycle type. For holding the plunger, 6, non-rotatable in its bearing, notwithstanding it is cylindrical, it is provided with a spline member, 9, projecting radially from said plunger and engaging a longitudinal slot, $7^a$, in the bearing, 7. This spline member, 9, carries a trigger-engaging abutment member which consists in the construction shown, of two pieces of steel, 10 and $10^a$, of a quality adapted for enduring the wear, lodged one upon the other, the piece, 10, projecting beyond the end of the piece, $10^a$, and the latter having its end beveled to present a slightly undercut shoulder, $10^b$, for the engagement of the trigger terminal, $11^a$, which is a similar piece of wear-enduring steel mounted in the upper end of the trigger lever, 11, fulcrumed at 12, and operated by its connection with the centrifugal governor, 24, in a manner well understood, to lock the valve, 1, at open position after any opening stroke which occurs when the speed of the crank shaft is such as to cause the centrifugal governor to set the trigger over into the path of the shoulder, $10^b$. The two pieces, 10 and $10^a$, are secured in relation to each other and to the spline member, 9, by a single screw, 13, which is made sufficient for securing said parts fixedly against movement in any direction by having both the plates, 10 and $10^a$, provided at their upper ends with square notches which engage the downwardly-facing shoulder of an outwardly-projecting lug, $9^c$, with which the spline, 9, is provided, rendering it L-shaped in side elevation. Similarly, the terminal, $11^a$, of the trigger is secured fixedly to the end of the trigger member, 11, by a single screw, 14, which is rendered adequate for the purpose by making the said terminal with a notch in its rear end which engages the bottom of the slot or notch in the member, 11, into which the terminal is inserted. By this construction it is rendered easy to remove the two engaging parts, 11ª and 10ª, for dressing them when they become blunted or otherwise inaccurate from wear.

The spline member 9, is secured to the valve-operating plunger, 6, and adapted to be adjusted relatively to said plunger, as is desirable in order to accommodate the reduction by dressing necessary to remedy bluntness resulting from wear of the terminals, 11ª and 10ª, of the trigger action,—by means of a two-part clamp comprising two identically formed members, 15, 15, which have each two oppositely projecting lugs, 15ª and 15ᵈ, the corresponding lugs forming pairs at opposite sides of the middle part which embraces the plunger. The lugs, 15ᵈ, are connected for clamping the two part clamp onto the plunger by a screw, 17. The oppositely-projecting lugs, 15ª, are elongated and hooked inward at the outer end to form clasps which embrace the upper end portion of the spline member, 9, said lugs, 15ª, being parallel-sided to fit the parallel sides of said spline member, and the latter having a vertical elongated slot, 9ᵈ, for the clamping bolt, 16, which takes through one lug and screws into the other for clamping the lugs, 15ª, onto said spline for holding the latter as it may be adjusted within the range of the slot. The plunger, 6, is formed with two opposite parallel faces, 6ᵇ and 6ᶜ, and the middle part of each of the clamp members, 15, which engage the plunger comprise corresponding flat portions, 15ᵇ, which seat upon said flat faces of the plunger respectively; so that when said flat members are clamped onto the plunger they are held securely and non-rotatable with respect thereto. The lugs, 15ª and 15ᵈ, of the clamp members, 15, are positioned with respect to each other and with respect to the flat portions, 15ᵇ, which engage the flat face of the plunger, and with respect to the distance between said flat faces of the plunger, so that the screw, 17, drawing together the lugs, 15ᵈ, 15ᵈ, will clamp the said clamp members tightly upon the plunger, 6, by the engagement with the flat faces, 6ᵇ and 6ᶜ, without drawing the lugs, 15ª, 15ª, so closely together as to clamp the spline, but on the contrary, so that said spline will be held loosely between said lugs, 15ª, until it is subsequently clamped by the bolt, 16. The clamp device is thus rendered securable upon the plunger, 6, while the spline is adjustable with respect thereto; but the tightening of the bolt, 16, for securing the spline in adjusted position will further clamp the device onto the plunger; so that both bolts are available for rendering it securely fastened thereon when all the parts are adjusted for position of operation.

For adjusting the valve-stroke to be produced by the plunger, 6, said plunger has an adjustable terminal, 19, consisting of a screw set into the end of the plunger and provided with a jam nut, 20, to secure it as it may be adjusted longitudinally with respect to the plunger. It will be understood that the head of the terminal bolt, 19, encounters the end of valve stem, 1ª, for operating the valve when the plunger is actuated by the cam.

I claim:—

1. In a hit-or-miss valve action for internal combustion engines, a governor-controlled detent and a cam-actuated valve opener, said two parts each having a terminal which has an edge for coöperation with the like edge of the terminal of the other part, said terminals being adapted for grinding of their said coöperating edges, the terminal of the detent lever being removable therefrom for dressing, and that of the valve opener being both removable for dressing and adjustable in the direction of the movement between said coöperating parts.

2. In a construction for the purpose indicated, in combination with a cylindrical valve-opening plunger, having a cylindroidal rounded end for encountering the operating cam, means for holding said cylindrical member non-rotatable and reciprocable in its bearings, consisting of a spline holder for clamping a guiding spline onto said cylindrical member; a spline adapted to be held in said clamp, the cylindrical valve opener having at opposite sides flat faces for seating the clamp, the clamp having corresponding flat portions for engaging said flat faces of the valve opener; lugs for engaging the spline, and a clamping bolt taking through said lugs for simultaneously clamping the valve opener and the spline.

3. In the construction defined in claim 2 foregoing, the clamp comprising two members having two oppositely-extending lugs, corresponding lugs of the two members constituting pairs, one pair having flat faces toward each other adapted to engage the spline between them, and a bolt taking through the other pair for drawing the two clamp members together and clamping onto the valve opener; the spline having an elongated aperture through which the bolt which clamps said lugs upon it passes; whereby the clamp may be held clamped onto the valve opener without clamping the spline, and the latter may be adjusted longitudinally, and subsequently clamped.

4. In a construction for the purpose indicated in combination with a valve opener and a cam which actuates it, the governor-operated detent lever and detent-engaging parts on the valve opener coöperating with said detent lever in its said action; said valve opener being cylindrical and mounted slidably in a cylindrical bearing, said bearing having a radial spline-receiving recess; a spline associated with said valve opener for engaging said recess to hold the valve opener non-rotatable while reciprocable, the detent-engaging parts on the valve opener being mounted on the spline; means for clamping the spline to the valve opener.

5. In the construction defined in claim 4 foregoing, the spline having an elongated slot; means for clamping the spline to the valve opener comprising a clamp having lugs for engaging the spline, and a clamping bolt taking through said lugs and through said slot in the spline.

6. In the construction defined in claim 4 foregoing, the means for clamping the spline to the valve opener being a two-membered clamp device, each member having lugs projecting in opposite directions, the corresponding lugs of the two members constituting pairs; means for connecting the one pair of lugs together to clamp the interposed part; the spline having an elongated slot and being adapted to be engaged between one of said pairs of lugs of the clamp, the clamping bolt for said pair taking through said elongated slot, the other pair of lugs being adapted to be drawn together by the bolt which connects them to secure the clamping device onto the valve opening while the spline member is still held loosely between the lugs which embrace it, and thereby free to be adjusted and subsequently clamped by said lugs.

In testimony whereof I have hereunto set my hand at Chicago, Illinois, this 3 day of March, 1919.

HENRY KOCOUREK.